3,014,930
HYDROXYETHYLATED ANTHRAQUINONE
Wilhelm Muenster and Erich Dreher, both of Ludwigshafen (Rhine), Germany, assignors to Badische Anilin- & Soda-Fabrik Aktiengesellschaft, Ludwigshafen (Rhine), Germany
No Drawing. Filed Jan. 22, 1957, Ser. No. 635,117
1 Claim. (Cl. 260—383)

This invention relates to a compound having the formula

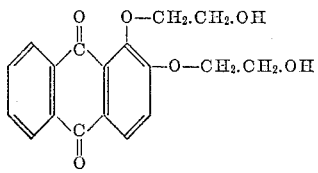

It is already known to prepare hydroxyethylation products in which one mol of ethylene chlorhydrin is added on to one hydroxyl group, by reaction of alcohols or phenols with ethylene chlorhydrin in the presence of stoichiometrical amounts of alkali. By this method of working relatively pure hydroxyethylation products are obtained without the formation of polyglycols. For the working up of larger amounts of alcohols or phenols, however, this method is troublesome and expensive.

It is also already known that alcohols and phenols can be reacted with ethylene oxide in order to form hydroxyethylated products at temperatures above 100° C. in the liquid state in the presence of catalytic amounts of alkali. By working in this way, however, considerable amounts of polyglycols are formed as undesirable by-products.

We have now found that substances having phenolic hydroxyl groups and which melt above 100° C. can be reacted in a simple way with ethylene oxide to give high yields of hydroxyethylation products by working at temperatures below 100° C., preferably at an ethylene oxide pressure which lies below the saturation pressure of the ethylene oxide and advantageously in the neighbourhood of the saturation pressure. There are thereby obtained relatively unitary reaction products, one mol of ethylene oxide having been added on to each hydroxyl group of the initial material.

The reaction takes place in the presence of alkaline hydroxyethylation catalysts, for example, sodium or potassium hydroxide, sodium or potassium carbonate, sodium or potassium bicarbonate, alkaline-earth hydroxide and basic salts of an alkaline-earth metal, sodium or potassium cyanide, and quaternary ammonium salts for example trimethylbenzylammonium and methoxide ethoxide. The catalysts are directly introduced into the reaction vessel in amounts of about 0.2 to 1% by weight, with reference to the phenolic component, in the liquid or solid state, preferably finely divided. It is also possible when using alkaline catalysts, however, to convert a part of the initial material into the phenolate before the reaction and to add this. The alkali content of the phenolate should correspond to the amount by weight of the catalyst required. It is also possible to supply the alkali in some other form. For example if the alkali is supplied in the form of an alcoholate, however, it is necessary after the reaction with ethylene oxide to separate the alcohol set free from the hydroxyethylation product. Finally it is also possible to use aqueous solutions of the catalysts. There are then formed, besides the hydroxyethylation products formed, small amounts of glycols or polyethylene glycols.

There may be used quite generally, as initial materials, phenols of which the melting point lies above 100° C. and which therefore are present in the solid state at the reaction temperature. By reaction with ethylene oxide they are converted into unitary defined hydroxyethylation products which contain one mol of ethylene oxide to one hydroxyl group. The reaction of the phenols with ethylene oxide according to this invention leads to substances which in their properties are equal to those compounds which are obtained by the reaction of phenols with ethylene chlorhydrin. It would have been expected that solid initial materials would only enter into reaction slightly and that the ethylene oxide, especially when using alkaline catalysts, would be converted into polyglycols.

Examples of compounds which can be converted into defined hydroxyethylation products of the said kind are mononuclear phenols with one or more hydroxyl groups, for example, pyrocatechol, resorcinol, hydroquinone, pyrogallol, phloroglucine, hydroxyhydroquinone, substituted phenols, for example dihydroxyacetophenone. The process is especially suitable for the hydroxyethylation of compounds which contain a plurality of aromatic radicals, for example, of benzene, with one or more hydroxyl groups, such as the bis-phenols, for example 4.4'-dihydroxydiphenylmethane, para.para'-dihydroxydiphenyldimethylmethane, para.para' - dihydroxydiphenylsulfone, para.para'-dihydroxybenzophenone. It is also possible to hydroxyethylate according to this invention condensed systems having hydroxyl groups, such as the hydroxynaphthalenes, hydroxyphenanthrenes and hydroxy-anthraquinones. The initial materials are introduced into the reaction vessel in solid finely powdered form; they may also be introduced, however, in the fused state.

The reaction with ethylene oxide is carried out at temperatures below 100° C., preferably between 70° and 95° C., advantageously at 80° to 90° C.

The ethylene oxide may be supplied either continuously or batchwise, in small portions, preferably in liquid form. For safety reasons, the reaction vessel is previously rinsed out with an inert gas, preferably with nitrogen, and provided, for example, with a nitrogen pressure of 0.5 to 1 atmosphere above atmospheric pressure. Only then is the ethylene oxide forced in. During the reaction, a pressure below the saturation pressure of ethylene oxide is used, advantageously in the neighbourhood of the same, for example at 1 to 10 atmospheres, advantageously at 2 to 4 atmospheres. As the saturation pressure of the ethylene oxide there is understood a pressure at which the ethylene oxide begins to liquefy at the prevailing temperature. By working below this pressure, there is no liquid phase of ethylene oxide present in the reaction vessel. These process conditions also determine the lower temperature limit. When working at normal pressure, for example, it is at about 20° C., i.e. it lies above the boiling point of the ethylene oxide at the prevailing pressure.

The hydroxyethylated phenols produced according to this invention are suitable without further purification for the production of textile assistants and epoxy resins.

The following example will further illustrate this invention. The parts specified in the example are parts by weight.

*Example*

340 parts of 1.2-dihydroxyanthraquinone of the melting point 289° C. and 2 parts of potassium hydroxide are heated to 90° C. and reacted with 128 parts of ethylene oxide at 80° to 95° C. as described in Example 1. After 3 hours 465 parts of a raw reaction product of the melting point 176° to 180° C. are obtained. This reaction product can be purified by recrystallization from diethyleneglycol diethylether to a product of the melting point 189° to 190° C.

We claim:
A bis-(hydroxyethyl)ether of 1.2-dihydroxyanthraquinone of the formula:
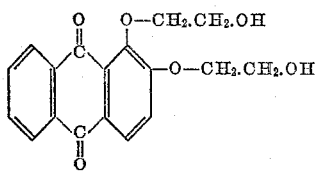
References Cited in the file of this patent
UNITED STATES PATENTS
| | | |
|---|---|---|
| 2,504,064 | Bock | Apr. 11, 1950 |
| 2,593,411 | Caldwell | Apr. 22, 1952 |
FOREIGN PATENTS
| | | |
|---|---|---|
| 515,907 | Great Britain | Dec. 18, 1939 |